Aug. 7, 1945.                F. BRANDSTROM                2,381,640
                              AIR VOLUME CONTROL
                          Filed Feb. 24, 1943              3 Sheets-Sheet 3
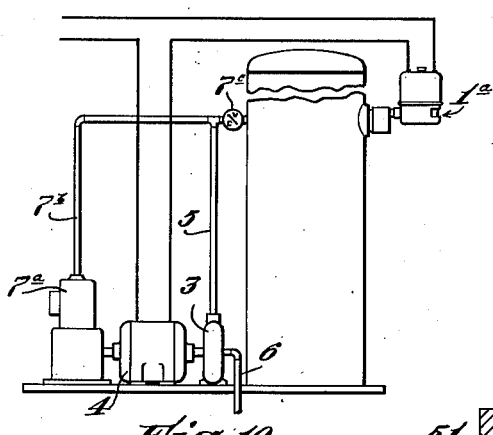
Fig.10
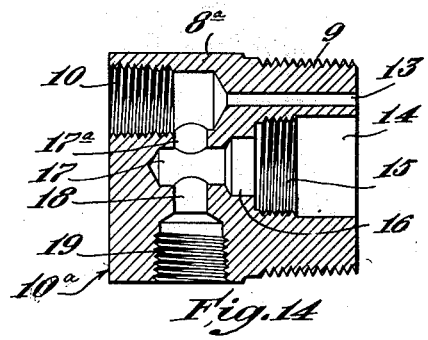
Fig.14
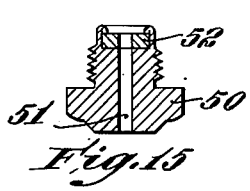
Fig.15
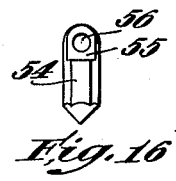
Fig.16
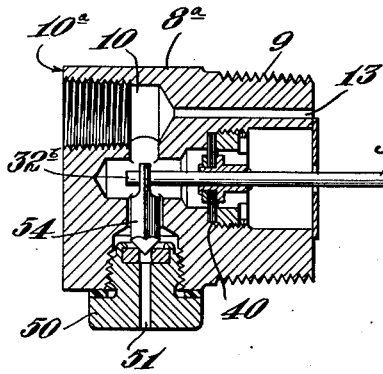
Fig.11
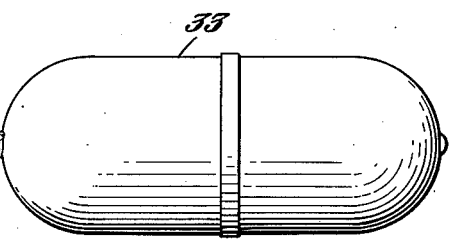
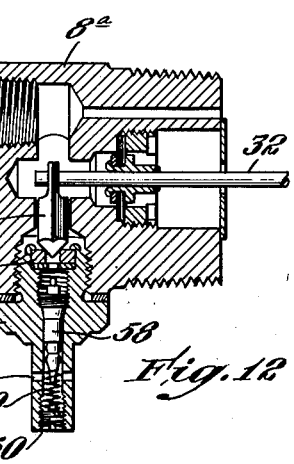
Fig.12
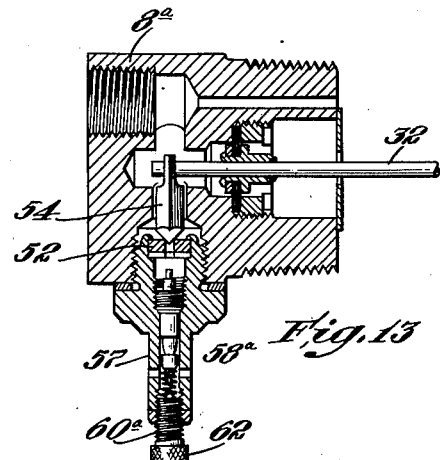
Fig.13
Inventor
Fred Brandstrom
by Roberts Cushman & Woodberry
Attys.

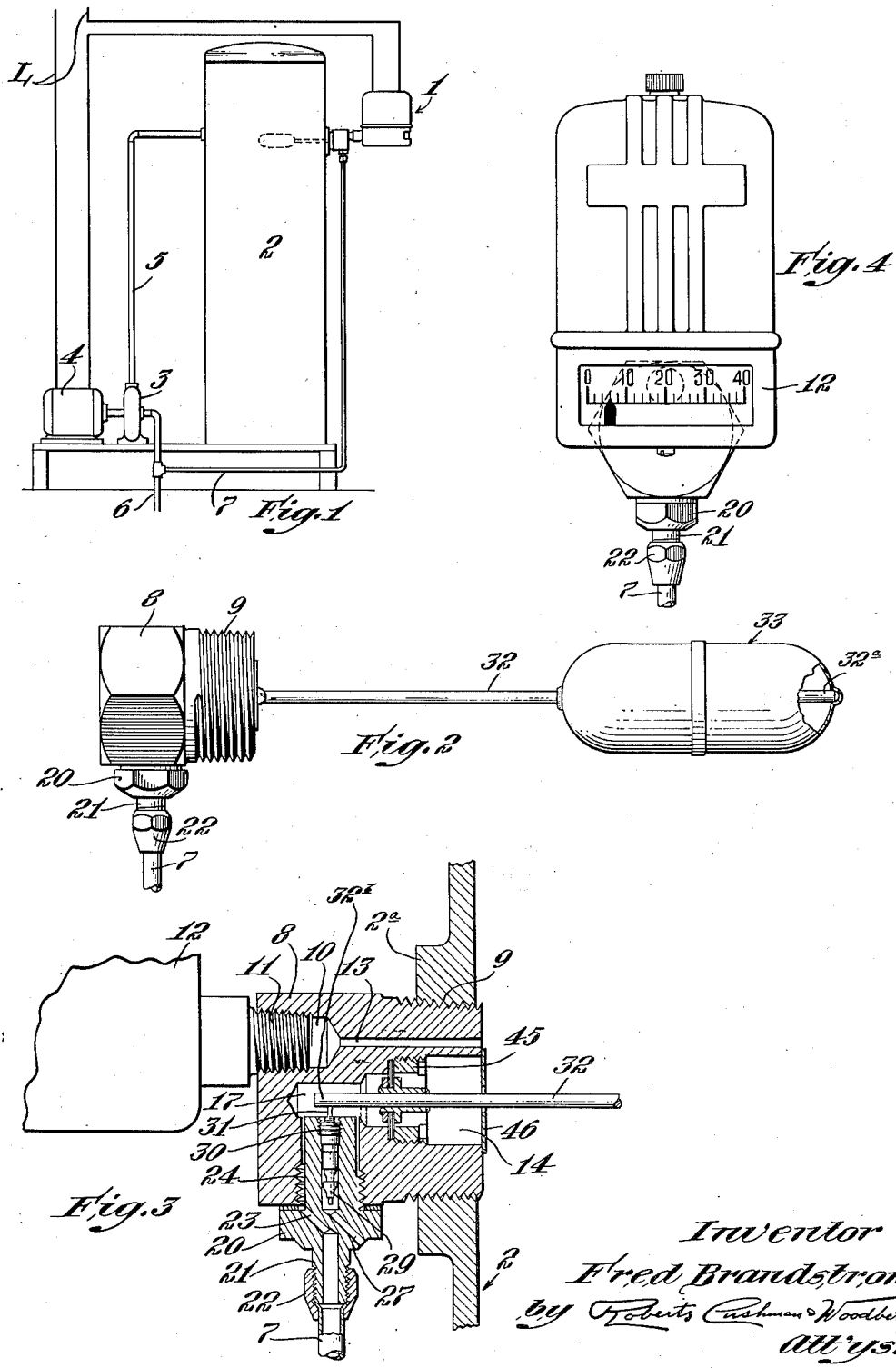

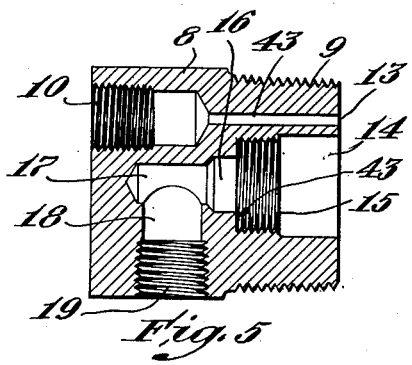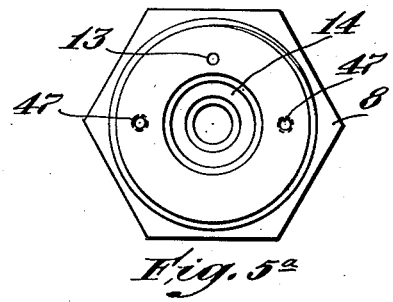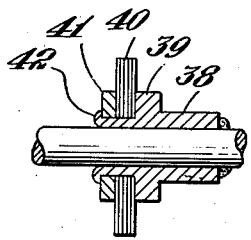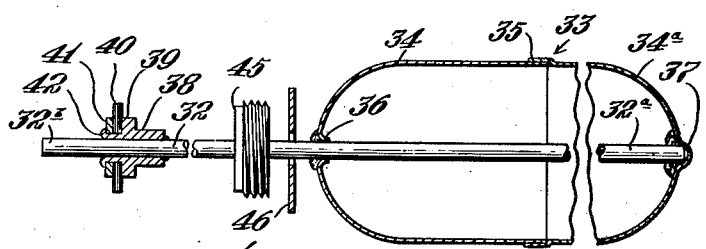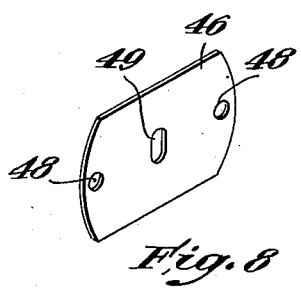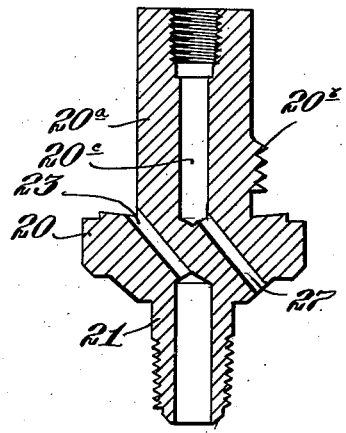

Patented Aug. 7, 1945

2,381,640

UNITED STATES PATENT OFFICE 2,381,640

AIR VOLUME CONTROL

Fred Brandstrom, Westport, Conn., assignor to Manning, Maxwell & Moore, Incorporated, New York, N. Y., a corporation of New Jersey Application February 24, 1943, Serial No. 476,941

4 Claims. (Cl. 103—7)

This invention pertains to liquid storage systems of the kind in which the liquid is intermittently delivered to an air-tight tank or reservoir by a pump or the like and is kept under resilient pressure by a body of gas entrapped within the reservoir above the liquid. A domestic water supply system comprising an air-tight tank or reservoir of moderate capacity is hereinafter specifically referred to as exemplifying one field of utility for the present invention which more particularly relates to an automatic air volume controller for use in such a system.

It is essential, for efficient service and greatest economy, that the volume of air maintained within the tank be such as entirely to fill the tank at such pressure as just about to balance a column of water of a height equivalent to the distance between the bottom of the tank and the lowest discharge outlet on the service pipe of the system, thus making it possible to draw out all of the water which is pumped into the tank from any part of the service piping connected to the tank. This requirement makes necessary the introduction of air additional in volume to and under higher pressure than that naturally filling the tank at atmospheric pressure.

Various methods of introducing into the tank the additional amount of air required (over that which will enter naturally and at atmospheric pressure) have been suggested previously; among them the admission of air in small regulated amounts into the suction pipe of the water pump through a suitable control valve—the air being drawn in by the partial vacuum in the suction pipe and carried with the water through the pump delivery pipe into the tank; and the provision of a power actuated air pump or compressor designed to deliver air under pressure directly into the tank and whose operation is independent of pressure conditions in the intake of the water pump. It is plain that by such prior methods of introducing air the relative volumes of air and pressure are quite likely to become disproportioned due not only to tank leakage and absorption of air by the water but also to the unregulated supply of air which may be introduced.

Among the objects of the invention are to provide a simple, cheap and easily manufactured air volume controller useful in systems of the above type—in particular to provide a controller whose constituent parts may in most instances be made rapidly and cheaply by automatic machinery of commercial type and to such dimensional tolerances as to make them interchangeable; to provide air volume control for use with either of the above mentioned types of air supply; to provide an air volume controller of small dimensions and whose installation in a completed tank or reservoir necessitates merely the provision of a single comparatively small tapped hole in the wall of the tank; and further to provide an air volume controller having provision for so associating with it a pressure gauge that the single opening in the tank wall above referred to suffices for the entire assembly.

Other and further objects and advantages of the invention will be pointed out hereinafter in the following more detailed description and by reference to the accompanying drawings, wherein Fig. 1 is a diagram illustrating the present invention as used in a domestic water supply system;

Fig. 2 is an elevation, to larger scale, illustrating the air pressure control device of the present invention;

Fig. 3 is a view generally similar to Fig. 2, but to larger scale and with certain parts broken away and others in vertical section, showing the device installed in the wall of a tank or reservoir;

Fig. 4 is an end elevation of the device shown in Fig. 3;

Fig. 5 is a diametrical vertical section through the supporting plug upon which the other parts of the control device are mounted;

Fig. 5ª is a front elevation of the plug of Fig. 5;

Fig. 6 is a fragmentary elevation of the float-supporting rod showing the pressure sealing diaphragm mounted thereon;

Fig. 7 is a diametrical section, to larger scale, showing, in detail, the mode of securing the float rod to its supporting diaphragm;

Fig. 8 is an elevation of a guide plate designed to guide the float rod as it moves up and down;

Fig. 9 is a diametrical section, to large scale, of the air inlet plug;

Fig. 10 is a view generally similar to Fig. 1 but illustrating the invention as embodied in a system comprising a power driven air compressor for delivering air to the storage tank;

Fig. 11 is a view similar to Fig. 5, but illustrating a control device useful in the system of Fig. 10;

Fig. 12 is a view similar to Fig. 11, but showing a further modification wherein provision is made for maintaining, at certain times, a predetermined pressure within the storage tank;

Fig. 13 is a view similar to Fig. 12, but showing a slight modification of the structure illustrated in the latter figure;

Fig. 14 is a vertical, diametrical section through the supporting plug forming a part of the devices shown in Figs. 11, 12 and 13, but with the moving parts removed;

Fig. 15 is a vertical diametrical section showing a valve seat arrangement used in the device of Fig. 11; and Fig. 16 is a side elevation of a valve employed in the device of Figs. 11, 12 and 13.

Referring to the drawings, the numeral 1 (Fig. 1) designates the improved air pressure control device of the present invention as a whole, such device being shown as mounted at the upper part of the side wall of an air-tight water reservoir 2. This reservoir is supplied with water by means of a pump 3 of any suitable type driven by an electric motor 4 and delivering water through the pipe 5 into the upper part of the tank 2. The pump is provided with a suction pipe 6 from which extends the branch pipe 7 which communicates with the air inlet of the pressure control device 1. The motor is supplied with current from the power line L, the motor being in series with the pressure control device 1 so that the switch forming a constituent part of the latter determines the starting and stopping of the motor.

Referring to Fig. 3 the improved control device of the present invention comprises a support 8 in the form of a plug having a pipe thread at 9 by means of which it may be screwed into a threaded aperture in the wall 2ª of the tank 2. This plug is provided with an eccentrically located bore 10 leading inwardly from its outer end, and this bore is internally screw threaded to receive a threaded nipple 11 projecting from and constituting supporting means for a pressure-actuated electrical switch 12, here illustrated as housed in the same casing with a pressure gauge. This switch may be of any appropriate type comprising pressure-actuated motor means such, for example, as a diaphragm which in moving in one direction closes switch contacts, and when moving in the other direction separates the contacts. This switch as above suggested is connected in series with the motor 4 and thus determines the operation of the pump 3. A passage 13 extends from the inner end of the bore 10 to the inner end of the plug 8, thus providing free communication between the interior of the tank and the gauge and the pressure motor of the switch.

The plug 8 is furnished with an axial bore 14 (Figs. 5 and 5ª) leading inwardly from its inner end, such bore having an internally screw-threaded inner portion 15 beyond which the bore is continued to form a chamber 16 of smaller diameter than the main portion 14 of the bore, and this chamber 16 has a further extension 17 of still smaller diameter which intersects a vertical bore 18 extending inwardly from the periphery of the plug, and which is screw threaded at 19 at its outer portion.

This bore 18 receives an air control valve device 20 (Fig. 9) comprising a tubular portion 20ª designed to enter the bore 18 and having partial threads 20ᵇ which may be engaged with the threads at 19 thereby to secure the valve device in assembled relation with the plug 8. This valve device also comprises the externally threaded nipple portion 21 which is connected to the pipe 7, leading to the suction side of the pump, by means of a suitable coupling 22. A passage 23 extends from the interior of the tubular nipple 21 and connects with a longitudinal groove 24 extending to the upper end of the part 20ª, thus providing communication between the chamber 17 and the pipe 7.

Another passage 27 extends inwardly through the member 20 to provide an air inlet leading to the axial bore 20ᶜ of the part 20ª. Within this bore 20ᶜ is arranged a standard pneumatic tire valve 29 (Fig. 3) which has screw-threaded engagement with the upper part of the bore 20ᶜ and which is provided with an upwardly projecting stem 31 located in the chamber 17. By depressing the stem 31 the valve is unseated thus providing communication between the inlet passage 27 and the chamber 17.

The valve-actuating means comprises the elongate float-supporting stem 32 of rigid material having the hollow float 33 secured to its right-hand portion, as viewed in Fig. 3, and having its left-hand end 32ᵇ arranged to overlie the upper end of the valve stem 31. The float 33 preferably comprises two opposed hollow shells 34 and 34ª (Fig. 6), respectively, each having a cylindrical body portion and a spherically curved end, said shells being overlapped at 35 and permanently secured at this point by solder. The rod 32 passes through an opening at 36 in the closed end of the shell 34 and its right-hand end 32ª may be seated in a socket at 37 in the closed end of the shell 34ª, the rod 32 being secured at the points 36 and 37 by means of solder to the respective shells.

Near the left-hand end of the rod 32 a sleeve 38 (Fig. 7) is secured to the rod by means of solder, said sleeve having a radial flange 39 which forms a rigid support for one face of a flexible diaphragm 40 of suitable material, for example rubber, rubberized textile fabric, flexible metal, or the like. A washer 41 bears against the opposite surface of this diaphragm, and the left-hand end 42 of the sleeve 38, as viewed in Fig. 7, is peened over against the outer face of the washer to hold the parts in assembled relation. The diaphragm 40 is of a diameter greater than that of the chamber 16 in the plug 8, and is designed to rest against the shoulder 43 at the inner end of the threaded portion 15 of the bore 14. An annular nut 45 embraces the rod 32 and is designed to be screwed into the threaded portion 15 of the bore 14 and against the right-hand face of the diaphragm 40, thereby to compress the latter and hold it in leak-tight contact with the shoulder 43, thus providing a leak-tight closure for the chamber 17.

In order to guide the float in its vertical up and down movements a guide plate 46 is provided at the right-hand end of the plug 8. This guide plate (Fig. 8) is a thin piece of rigid material, for example metal, and is secured to the end of the plug 8 by screws passing through openings 48 in the guide plate and into threaded openings 47 (Fig. 5ª) in the end of the plug. This guide plate is furnished with a vertically elongate slot 49 through which the float rod 32 passes, the dimensions of the slot being such as to permit vertical movement of the rod, but substantially to prevent horizontal movement of the rod. The flexible diaphragm 40 constitutes flexible means for supporting the float so that the float is free to swing vertically although constrained by the plate 46 from moving horizontally, while at the same time the diaphragm effectively prevents leakage of pressure fluid into or out of the chamber 17.

In the operation of the device, assuming that the pump has been in operation and that the water level in the tank has risen sufficiently to lift the float 33 from the position indicated in Fig. 3, such rise of the float will cause the left-hand end 32ᵇ of the float rod to move downwardly, thus depressing the valve stem 31 and unseating the air valve 29. This provides communication between the air inlet 27 and the chamber 17. This chamber 17 is now in free communication with the suction of the pump and as the pump continues to operate, air is drawn into the suction pipe 6 and delivered with the water into the tank thus rapidly building up pressure. When the pressure has risen to a predetermined point, the pressure switch acts to stop the pump. When the water level in the tank again drops sufficiently to permit the float to drop, the valve stem 31 is released, thus allowing valve 29 to close. When the pressure drops sufficiently, the pump is started, thus delivering water to the tank, and when the water level has been raised so as to lift the float, air is again drawn in, thus completing the cycle, and always insuring the maintenance of a sufficient body of air above the water to provide the desired delivery pressure.

Referring to Fig. 10 the parts bearing the same reference numerals correspond to similarly designated parts in Fig. 1, but the controlling device 1 of Fig. 1 is replaced by the modified controlling device 1ª now about to be described. In Fig. 10 the pipe 7 of Fig. 1 is omitted and the motor 4 is arranged to drive both the pump 3 and an air compressor 7ª which delivers air under a definite predetermined superatmospheric pressure into the upper part of the tank 2.

The controlling device 1ª may in general be similar to the controlling device 1 above described, comprising a float-actuated valve mechanism and a combined gauge and pressure-actuated switch. This mechanism is carried by a support 8ª (Figs. 11 and 14) having a screw-threaded portion 9 designed to enter a suitable screw-threaded aperture in the wall of the tank. This support 8ª is furnished with the eccentric internally screw-threaded bore 10 leading in from its outer end 10ª, said bore being designed to receive the supporting nipple of the combined gauge and pressure switch and communicating, by means of a passage 13, with the interior of the tank. The support also has the axial bore 14 having the screw-threaded portion 15; a portion 16 of reduced diameter; and the inner portion or chamber 17 which in this instance communicates by means of a passage 17ª with the inner end of the bore 10. The support also has the downwardly extending bore 18 communicating at its upper end of the chamber 17 and having an enlarged internally screw-threaded outer portion 19. The float 33 and the float rod 32 are supported by the diaphragm 40 in the same way as above described. The inner end 32ᵇ of the float rod is located in the chamber 17.

In this instance the screw-threaded portion 19 of the bore 18 receives the seat-supporting plug 50 (Figs. 11 and 15) having a longitudinal bore 51 and being provided at its upper or inner end with an annular seat 52 which may be of any suitable material, for example rubber or fiber. With this seat cooperates a valve 54. This valve preferably has a polygonal body portion, for example it may be hexagonal, while its lower end 53 is conical and designed to cooperate with the seat 52 to close the passage 51. The valve 54 has a stem 55 which is provided with an opening 56, Fig. 16, which loosely receives the inner end 32ᵇ of the float rod 32. The polygonal portion of the valve constitutes a guide for contact with the wall of the bore 18, although its flattened surfaces provide communication between the chamber 17 and the region just above the valve seat 52. When the float is below the horizontal position the valve 54 is unseated and thus pressure fluid is free to escape from the tank through the passage 13, the inner end of the bore 10, the passage 17ª, the chamber 17, the bore 18, and the passage 51. On the other hand, when the float rises above the horizontal, the valve 54 is pressed down against the seat 52 thus preventing further escape of pressure fluid.

With this arrangement and assuming that the water level in the tank has dropped to a point such that the stem of float 33 is below the horizontal and further assuming that the pressure in the tank has dropped low enough to close the switch contacts, the motor 4 is started thus concomitantly actuating the pump 3 and the air compressor 7ª. Water and air are thus delivered into the tank 2, but since the valve 54 is unseated the air which enters the tank will be free to escape so that no substantial increase in pressure will occur within the tank. However, when the water level has risen sufficiently to cause the float 33 to become horizontal, the valve 54 will be seated and as the pump and compressor continue to operate the water level in the tank will rise and the air pressure above the water will increase at a rate greater than that which would result merely from the rise in level from the water. When the pressure in the tank has reached a predetermined amount the switch contacts will be opened automatically and the motor will stop. If desired, a check valve 7ᶜ may be arranged in the conduit leading from the pump and compressor to prevent leakage of pressure fluid out of the tank when the motor stops.

In some systems it is undesirable to permit the pressure in the tank ever to drop as low as atmospheric pressure and to insure this desired condition the arrangements illustrated in Figs. 12 or 13 may be employed. Thus in Fig. 12, while the other parts are in general like those just above described, the seat supporting plug 50 of Fig. 11 is replaced by the seat supporting plug 57 (Fig. 12). This plug is provided with an axial bore somewhat larger in diameter than the bore 51 of the plug 50 and within this bore is located a spring-loaded relief valve 58—preferably a valve of the type commonly employed in pneumatic tires. This valve is loaded by means of a spring 59 whose tension may be adjusted by the manufacturer, for example by means of a screw 60. Normally this valve 58 is closed, thus preventing escape of pressure fluid from the tank. Thus, when as above described, the float is below the horizontal and valve 54 is unseated, air can escape from the tank only so long as the pressure in the tank is sufficient to overcome spring 59 and unseat valve 58. When the pressure in the tank drops to a predetermined point, valve 58 automatically seats, thus preventing further reduction in pressure.

In the arrangement shown in Fig. 12 the parts are generally similar to those shown in Fig. 11 except that the tensioning spring which controls the automatic relief valve 58ª is easily adjustable from outside of the device by means of a screw 60ª having a knurled head 62 which is readily accessible for adjustment by the operator.

I claim:

1. In combination an air tight tank and a control unit comprising a support having an externally screw-threaded plug portion designed to enter a screw-threaded opening in the tank wall, said support having an eccentrically located internally screw-threaded bore extending into it from its outer end and designed to receive a threaded supporting nipple forming part of a pressure switch, the support having a longitudinal passage leading from the inner end of said eccentric bore to the inner end of the plug thereby providing communication between the interior of the tank and a pressure switch mounted on the support, the support having an axial bore extending inwardly from its inner end, and having a valve-receiving bore extending inwardly from its peripheral surface and intersecting the axial bore, a tire type valve having a protruding stem located in the valve-receiving bore and means for actuating the tire type valve comprising a float within the tank, the float having an elongate stem, a diaphragm extending transversely across said axial bore and forming one wall of an interior chamber constituted by the inner end of said axial bore, the float stem extending leak-tight through the diaphragm and the inner portion of the float stem overlying the end of the stem of the tire type valve for actuating the latter valve, means providing passages connecting said interior chamber with the interior of the tank and with the outer atmosphere respectively, the tire type valve being arranged to control the flow of air through the latter passage, and guide means operative to constrain the float stem to move in the plane of the axis of the tire type valve.

2. In combination with an air-tight tank and a motor driven pump operative to deliver liquid and air into the tank, a control unit including a support having an externally screw-threaded plug portion for insertion in a threaded opening in the tank wall, the support having a valve-receiving bore extending inwardly from its peripheral surface and which intersects an axial bore extending inwardly from the inner end of the support, a valve housing within the valve-receiving bore, said housing having air inlet and delivery passages, a conduit connecting the delivery passage with the suction side of the pump, a tire-type valve which controls communication between the inlet and delivery passages, and a float within the tank mounted upon the support and having a stem which extends along the axial bore and which is arranged to actuate the valve.

3. In combination in a liquid storage system of the kind in which liquid is intermittently delivered to an air-tight tank by means of a pump and is kept under pressure by a body of gas entrapped above the liquid, a gas volume controller comprising a support having an externally screw-threaded portion designed to engage a threaded opening in the wall of the tank, the support having an interior chamber which always communicates with the suction side of the pump and having an inlet passage leading to said chamber from a source of gas, a gas inlet valve controlling the flow of gas through said passage, and a float within the tank, the float having a stem which passes leak-tight through a flexible diaphragm forming a part, at least, of one wall of said chamber, the diaphragm constituting the sole support for the float and its stem, that portion of the stem which is within the chamber being arranged to actuate the gas inlet valve.

4. In combination, in a liquid storage system of the kind in which liquid and air are intermittently delivered into an air-tight tank by motor driven means, and in which a pressure-actuated switch, responsive to pressure variations in the tank, controls the operation of the motor, air volume controlling means comprising a control unit including a support having an externally screw-threaded plug portion for insertion in a threaded opening in the tank wall, the support being provided with means for mounting the motor controlling switch thereon, and having therein an interior chamber provided with a flexible fluid-tight wall and having a socket leading from the exterior of the support into said chamber, an air inlet valve device removably fixed in said socket, said air inlet valve device having a valve seat and an air inlet valve cooperable therewith to control the flow of air through a passage in the valve device extending between said interior chamber and the outer atmosphere, means providing communication between said interior chamber and the interior of the tank, a float within the tank, and motion-transmitting means passing leak-tight through the flexible wall of the chamber and operative to transmit motion from the float to the air valve.

FRED BRANDSTROM.